Jan. 29, 1963     H. A. WEBER, SR     3,075,782
CHILD'S ROCKING VEHICLE WITH FIGURE SIMULATION
Filed Feb. 15, 1960     5 Sheets-Sheet 1
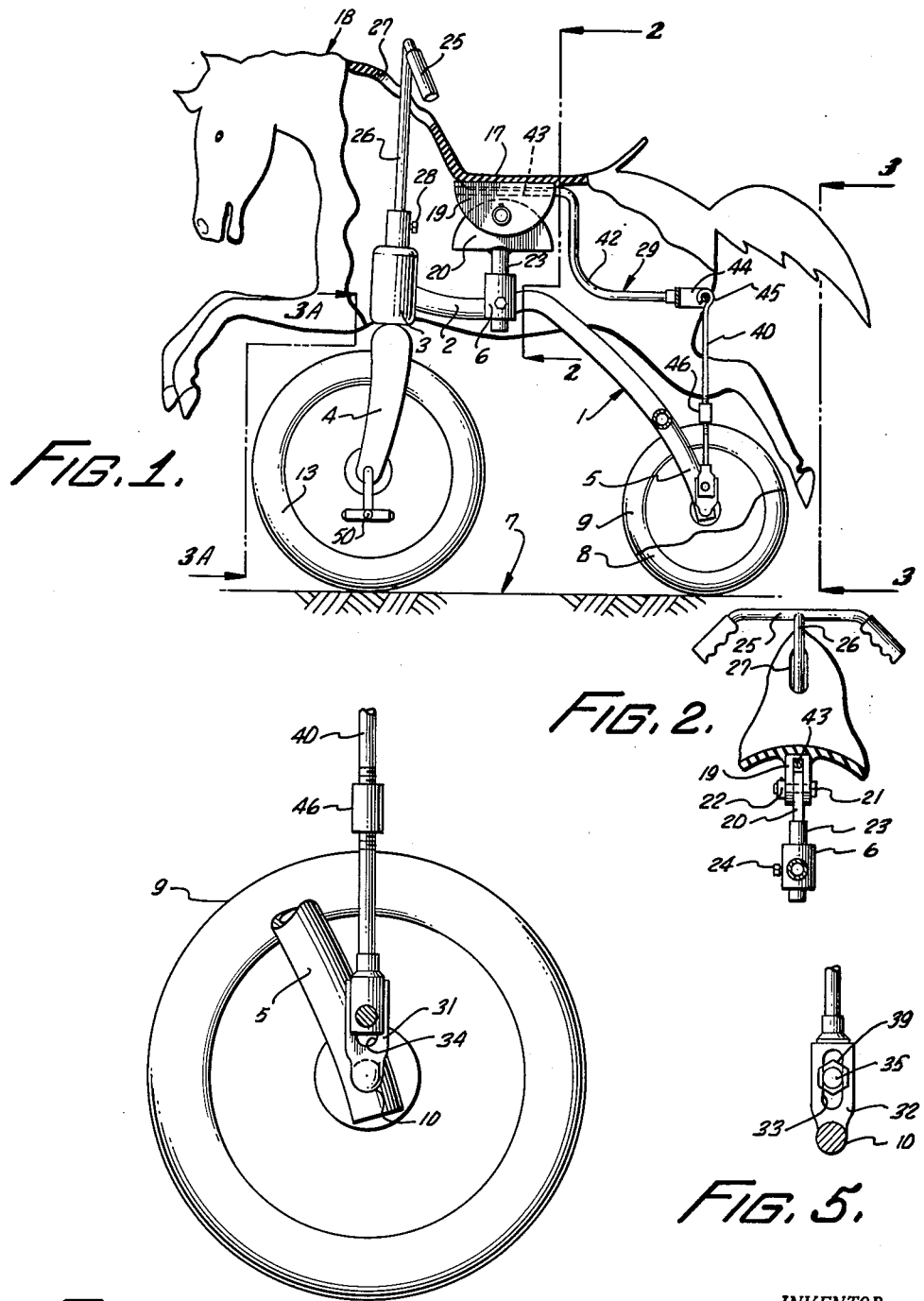
INVENTOR.
HARM A. WEBER, SR.
BY
Christie, Parker & Hale
ATTORNEYS Jan. 29, 1963   H. A. WEBER, SR   3,075,782
CHILD'S ROCKING VEHICLE WITH FIGURE SIMULATION
Filed Feb. 15, 1960   5 Sheets-Sheet 2
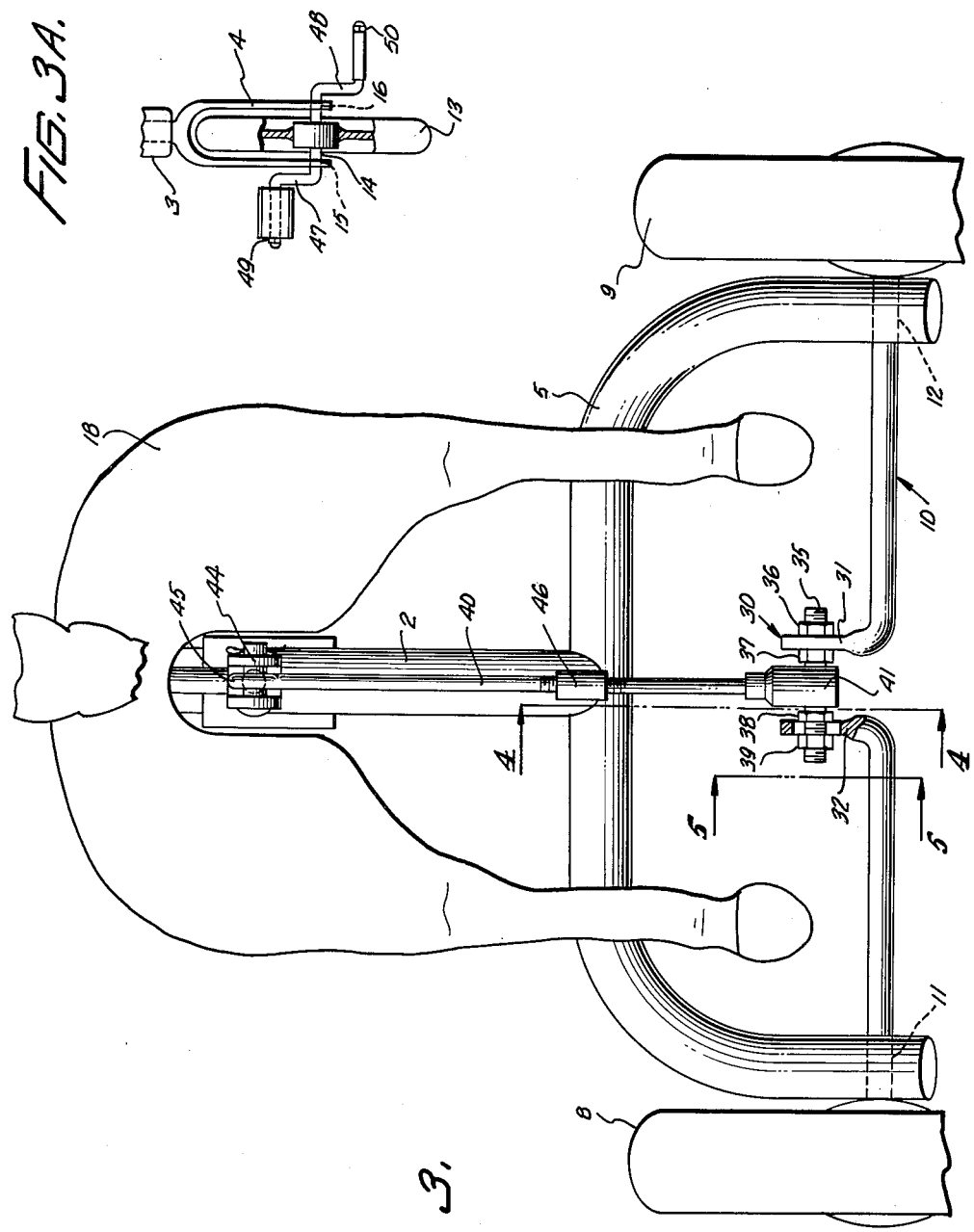
INVENTOR.
HARM A. WEBER, SR.
BY
Christie, Parker & Hale
ATTORNEYS.

Jan. 29, 1963 H. A. WEBER, SR 3,075,782
CHILD'S ROCKING VEHICLE WITH FIGURE SIMULATION
Filed Feb. 15, 1960 5 Sheets-Sheet 3
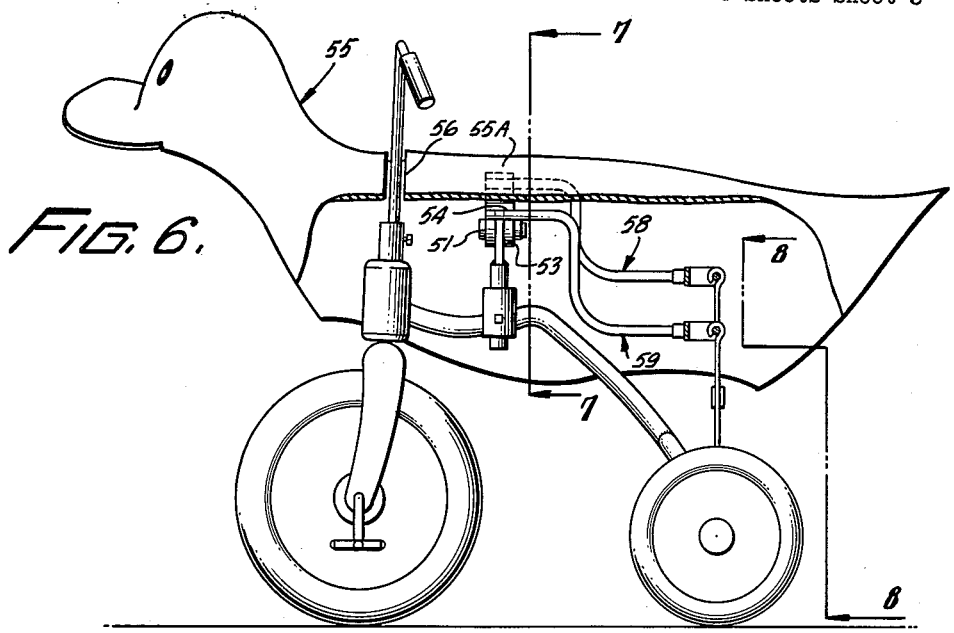
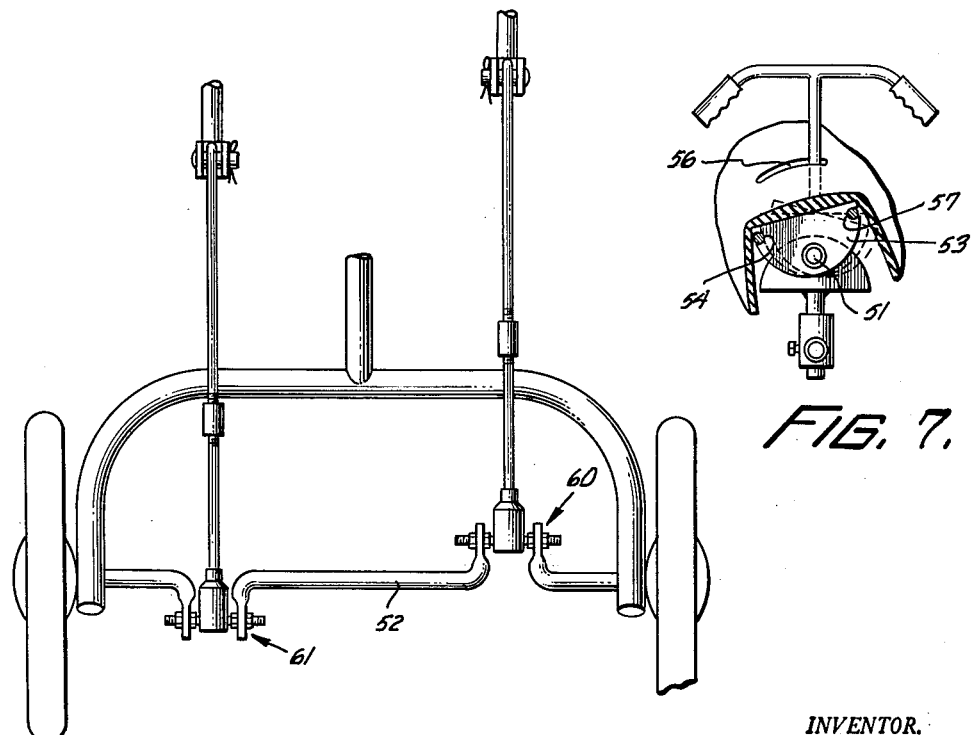
INVENTOR.
HARM A. WEBER, SR.
BY
Christie, Parker & Hale
ATTORNEYS.

Jan. 29, 1963 H. A. WEBER, SR 3,075,782
CHILD'S ROCKING VEHICLE WITH FIGURE SIMULATION
Filed Feb. 15, 1960 5 Sheets-Sheet 4

INVENTOR.
HARM A. WEBER, SR.
BY
Christie, Parker & Hale
ATTORNEYS.

Jan. 29, 1963   H. A. WEBER, SR   3,075,782
CHILD'S ROCKING VEHICLE WITH FIGURE SIMULATION
Filed Feb. 15, 1960   5 Sheets-Sheet 5
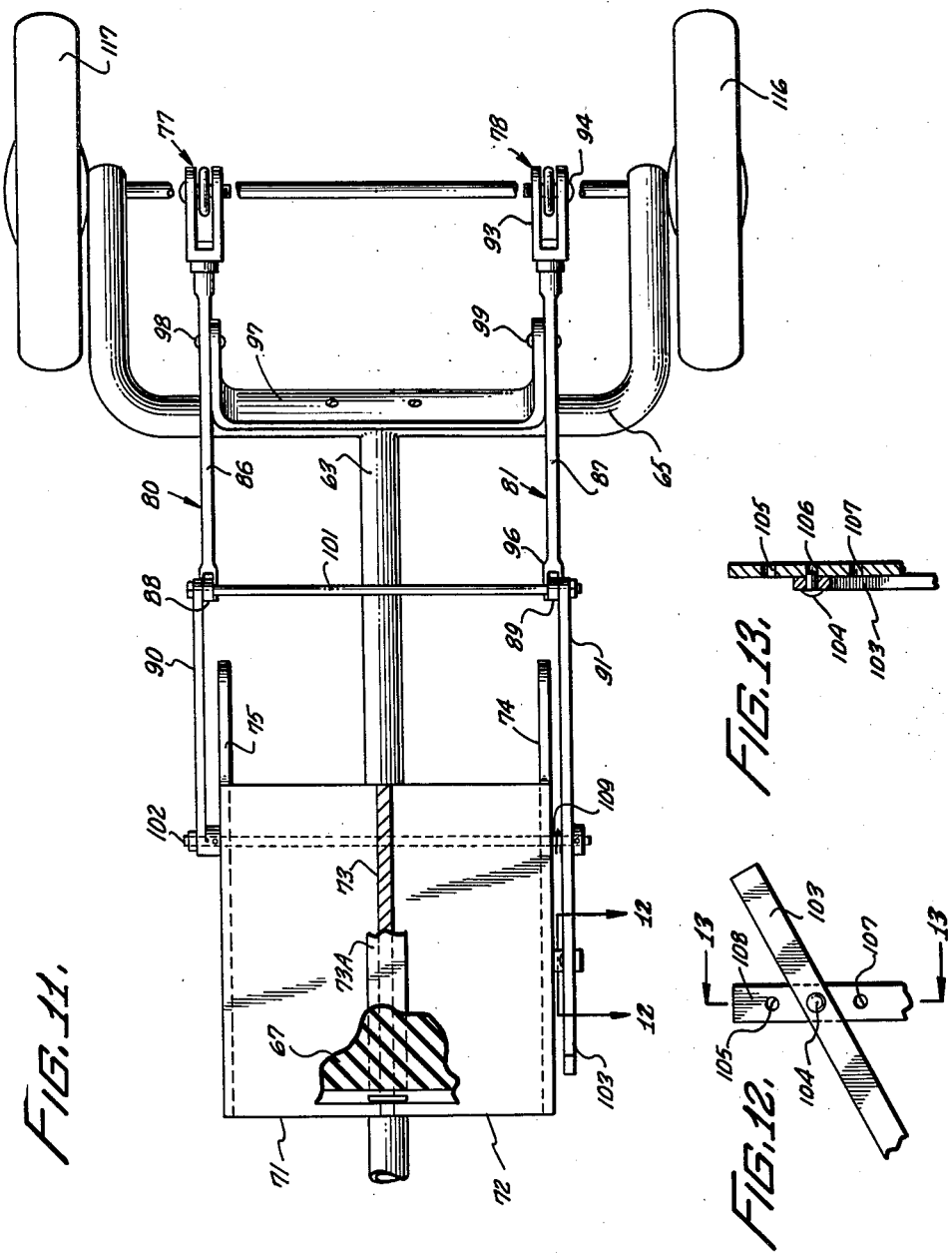
INVENTOR.
HARM A. WEBER, SR.
BY
Christie, Parker & Hale
ATTORNEYS.

United States Patent Office 3,075,782
Patented Jan. 29, 1963

3,075,782
CHILD'S ROCKING VEHICLE WITH
FIGURE SIMULATION
Harm A. Weber, Sr., 20 Highway Blvd., North Pekin, Ill.
Filed Feb. 15, 1960, Ser. No. 8,677
5 Claims. (Cl. 280—1.192)

The invention relates to a vehicle for children, particularly of the wheel supported type having a movable occupant supporting replica of a figure thereon.

Children like motion. They are, in general, attracted to vehicles which they can occupy and use to propel themselves from place to place, as, for example, the conventional child's pedal operated tricycle. Children also, in general, like replicas of figures which are appealing to childish imagination, such as a horse, "rocket ship," bird, airplane, or the like, and particularly like to ride such replicas and cause motion thereof as, for example, the conventional spring supported hobby horse.

My invention combines in a single vehicle the characteristics described above which are appealing to children, namely, a vehicle which the child can use to transport himself, a replica of a figure which is appealing to childish imagination and which the child can ride, and movement of such replica as such, as distinguished from the movement of the vehicle as a whole.

The apparatus of the invention is a vehicle for a child which is supported by a plurality of rotatable wheels, has movable support means for supporting a rider of the vehicle in the form of a replica of a figure appealing to childish imagination, has means for rotating the wheels of the vehicle, and has mean responsive to rotation of the wheels which oscillate the support means relative to the vehicle. As a consequence, a child may occupy the vehicle and use it to transport himself from place to place and at the same time enjoy oscillatory movement of the means which supports him on the vehicle. Moreover, the child's enjoyment of the vehicle is further enhanced because the means which supports him on the vehicle is a replica of a figure appealing to childish imagination.

The invention will be more clearly understood by reference to the following detailed description thereof taken in conjunction with the accompanying drawings, in which:

FIG. 1 is an elevational side view partially broken away along a longitudinal section of an embodiment of the invention;

FIG. 2 is a partial elevational view taken along the line 2—2 of FIG. 1;

FIG. 3 is a partial elevational end view of the embodiment shown in FIG. 1 looking along the line 3—3 in FIG. 1;

FIG. 3A is an elevational end view of the embodiment shown in FIG. 1 looking along the line 3A—3A in FIG. 1;

FIG. 4 is a sectional view taken along the line 4—4 of FIG. 3;

FIG. 5 is a sectional view taken along the line 5—5 of FIG. 3;

FIG. 6 is an elevational side view partially broken away along a longitudinal section of another embodiment of the invention;

FIG. 7 is a partial sectional view taken along the line 7—7 of FIG. 6;

FIG. 8 is a partial elevational end view of the embodiment shown in FIG. 6 looking along the line 8—8 in FIG. 6;

FIG. 11 is a partial plan sectional view of the embodiment shown in FIG. 9 taken along the line 11—11 in FIG. 9;

FIG. 12 is a fragmentary view taken along the line 12—12 in FIG. 11; and

FIG. 13 is a sectional view taken along the line 13—13 in FIG. 12.

Figures 9, 10:
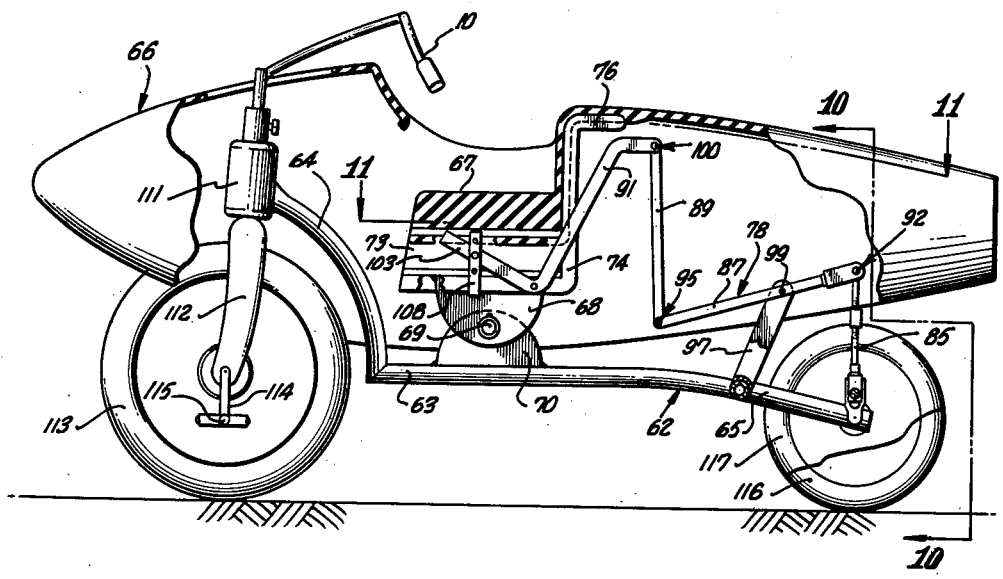
FIG. 9 is an elevational side view partially broken away along a longitudinal section of another embodiment of the invention.
FIG. 10 is an elevational end view partially in section of the embodiment shown in FIG. 9 taken along the line 10—10 in FIG. 9.

Referring now to FIG. 1, there is shown a vehicle for a child which embodies the invention. A vehicle frame 1 has a single support member 2 extending longitudinally of the vehicle and a steering boss 3 rigidly fixed in substantially vertical orientation to one end of the member 2. The frame includes a steering fork 4 which is journaled in the steering boss and has a pair of spaced downwardly extending elongated aligned legs. At the end of member 2 remote from the steering boss, the frame includes a rear fork 5 rigidly attached to the member 2 and extending equally transversely on each side thereof. As best shown in FIGS. 1 and 3, the rear fork 5 has a pair of relatively widely spaced downwardly extending aligned legs. Intermediate the steering boss and the rear fork the frame includes a support means boss 6. The support means boss is rigidly attached to the member 2 and has a substantially vertical opening extending through it. The frame is made of rigid material, preferably tubular, such as aluminum or ferrous tubing.

The vehicle is supported on the ground or other running surface 7 by means of a plurality of rotatable vehicle supporting wheels. The plurality of wheels numbers three in the embodiment shown in FIG. 1. As best shown in FIGS. 1 and 3, there are two rear wheels 8 and 9 of equal diameter which are journaled in the rear fork exteriorly thereof, one in the end portion of each downwardly extending leg of the rear fork. The rear wheels are so journaled by means of an elongated rear shaft 10 which extends transversely of the vehicle frame and is journaled therein at 11 and 12 by means of a suitable bearing or merely a hole in the frame. The rear wheel 8 is fixed to one end of the rear shaft 10 and the other rear wheel 9 is similarly fixed to the other end of the rear shaft, so that rotation of the rear wheels rotates the rear shaft. As best shown in FIGS. 1 and 3A, the third vehicle supporting wheel, the front wheel 13, is journaled in the vehicle frame between the downwardly extending legs of the steering fork. The front wheel is of larger diameter than the rear wheels. It is journaled in the steering fork so that it is positioned substantially equally from each of the rear wheels and also spaced longitudinally of the vehicle from the rear shaft 10 and transversely of the axis of rotation of the rear shaft. The front wheel is so journaled by means of a second shaft, the front shaft 14, to which it is fixed intermediate the ends of the front shaft at substantially the middle thereof, so that rotation of the front shaft rotates the front wheel. The front shaft is journaled at 15 and 16 in the end portion of each leg of the steering fork and extends through and exteriorly of each leg. The front shaft is oriented so that its axis of rotation lies in a plane which is either the same as or parallel to the plane of the axis of rotation of the rear shaft. Since the steering fork 4 is rotatable about a substantially vertical axis, it is apparent that the axis of rotation of the front shaft 4 may be similarly rotated by rotating the steering fork, thus changing the angular relation between the axis of rotation of the front shaft and the rear shaft, even though the two axes remain in the same plane or parallel planes. The vehicle supporting wheels 8, 9 and 13 are of conventional construction such as is commonly found in children's tricycles. They may have rubber or ballon tires and spokes or disk structure connecting the tire to the central wheel hub.

As shown in FIG. 1, the vehicle has support means 18 which is adapted at 17 to support a child astride and riding the vehicle with one leg on each side of the support means.

The support means 18 includes a three-dimensional replica of a figure which is appealing to childish imagination, such as the horse shown in FIG. 1. The figure need not be a horse but may be any object which may be appealing to childish imagination, such as a turtle, duck, bird, airplane or "rocket ship." The replica is preferably hollow and preferably made of resiliently yieldable material, such as rubber or rubber-like material. Preferably, the replica surrounds as much of the vehicle as possible, in order that it will function as a protective bumper, thus preventing contact of the vehicle with external objects and protecting both from damage.

The support means 18 is pivotally attached to or mounted on the vehicle frame by means of a U-shaped pivot fork 19 which has downwardly extending legs sandwiching a single pivot plate 20 and is connected thereto by a suitable pivot pin 21 held in place by conventional means, such as the set screw and collar 22, all as best shown in FIG. 2. The pivot fork 19 is fastened to the portion 17 of the support means in conventional manner, such as embedment in the replica, rivets or the like, and is thus part of the support means. The legs of the pivot fork and the pivot plate are oriented substantially vertically, longitudinally of the vehicle frame, and transversely to the axis of rotation of the rear shaft 10. They are preferably plate members of extended width with only working clearance between them, in order to inhibit any motion of the support means laterally of the vehicle in a direction transverse to the plane of movement of the support means about the pivot pin 21. The pivot pin 21 is oriented transversely of the vehicle frame and substantially parallel to the axis of the rear shaft, so that movement of the support means about the pivot is limited to a substantially vertical plane extending longitudinally of the vehicle and transversely to the axis of rotation of the rear shaft. The replica is suitably cut away to permit the desired movement of the support means about the pivot pin 21 without interference from the vehicle frame or wheels.

The lower portion of the pivot plate 20 is rigidly attached to a support post 23 which movably extends through the opening in the support means boss 6. The support post is releasably secured against movement relative to the support means boss by conventional means, such as a clamping collar secured to the support means boss or, as shown, a bolt 24 which is threadedly received in the support means boss and extends therethrough to bear against the support post or, if desired, to register in a suitable transversely extending aperture in the support post. This means of securing the support post to the vehicle frame is advantageous because it enables the vertical height of the support means to be adjusted in order to accommodate riders of the vehicle of different sizes, particularly different leg lengths of such riders.

The vehicle has means attached to the steering fork adapted to enable a rider of the vehicle to rotate the steering fork about its substantially vertical axis and thus cause the vehicle to move in a curvilinear path. The steering means preferably is a conventional handlebar 25, although it may be a wheel or any other structure adapted to be grasped by a rider and moved so as to apply torque to a substantially vertical steering shaft 26 to which the handlebar is fixed. The steering shaft is an elongated member which extends through a suitable slot 27 in the replica. The slot 27 is formed in such manner as to permit the replica to move about the pivot pin 21 within the desired limits of such movement. The steering shaft 26 is removably fixed to the steering fork with conventional means, such as previously described for the support post 23, and may be a bolt 28 threadedly received in a portion of the steering fork which movably receives the steering shaft and bears against the steering shaft 26 or registers in a hole formed therein, so that rotation of the steering shaft by means of the handlebar 25 will rotate the steering fork and the amount of projection of the steering shaft from the steering fork is adjustable.

Connecting means extends between and is connected to the support means and the rear shaft 10, whereby the support means moves about its pivot 21 with an arcuate oscillatory motion responsive to rotation of the rear shaft 10 produced by rotation of the rear wheels 8 and 9. The connecting means is comprised of rigid link means 29 and an eccentric connection 30 of the link means to the rear shaft 10 eccentrically of the axis of rotation thereof. The eccentric connection of the link means to the rear shaft may be effected in several ways as, for example, by means of a plate cam eccentrically mounted on the rear shaft and provided with a follower attached to the link means or by connecting the link means to the outer face of the rear wheels at a point spaced from the center of rotation of such wheels, but it is preferred that the eccentric connection 30 be effected by means best shown in FIGS. 3, 4 and 5. As shown in FIG. 3, a single double crank is fixed to the rear shaft 10 at substantially its middle and aligned with the pivot pin 21. The double crank is comprised of a pair of cranks 31 and 32 which extend from the rear shaft radially of its axis and are fixed thereto. The cranks may be separate elements removably keyed to the rear shaft, but preferably, they are formed integrally with the rear shaft, as shown in FIG. 3. The cranks 31 and 32 are angularly aligned about the axis of the rear shaft and are spaced from each other longitudinally of the rear shaft. As shown in FIG. 5, the crank 32 has an elongated slot 33 which extends lengthwise of the crank and radially of the axis of the rear shaft 10. The other crank 31 has an identical aligned slot 34, as shown in FIG. 4. A crankpin 35 extends through the aligned slots 33 and 34 and is secured to the crank 31 by means of double nuts 36 and 37 threadedly received on the crankpin. The crankpin is secured to the crank 32 in similar manner by means of the nuts 38 and 39. The crankpin is thus removable from the cranks, and its radial spacing from the axis of the rear shaft 10, or the amount of its eccentricity with reference to such axis, may be adjusted by loosening the double nuts, moving the crankpin in the slots to the position desired, and then tightening the double nuts to secure the crankpin to each of the cranks. By thus varying the amount of eccentricity of the crankpin, the amplitude of the oscillatory movement of the support means may be correspondingly varied. The crankpin is oriented with its axis substantially parallel to the axis of the rear shaft and to the axis of the pivot pin 21. Alternatively, the radially adjustable crankpin may be formed by means of a U-shaped member which extends between the cranks and has one of its legs overlying each of the cranks and removably secured thereto, as by means of bolts. The rigid link means 29 may be a continuous link which is relatively rigid but yet has some resilient "give" pivotally connected to the crankpin and extending to the support means and connected thereto, but it is preferred that the rigid link means be comprised of a rigid upwardly extending connecting rod 40 pivotally attached to the crankpin 35 by means of a suitable bearing 41 or merely a hole formed in the connecting rod, and a rearwardly extending actuating rod 42 rigidly connected at 43 to the pivot fork 19, and thus to the support means, and terminating in a clevis and pin 44 which pivotally and removably receive an eye 45 formed on the end of the connecting rod remote from the crankpin. It is preferred that the actuating arm be made of resiliently yieldable material to better absorb impact loads imposed upon the support means, such as a child jumping on it. Rotation of the crankpin about the axis of the rear shaft 10 produces oscillatory motion of the eye 45 of the connecting rod which in turn is transmitted to the support means 18 by means of the actuating rod 42. Thus, rotation of the rear wheels causes the support means to arcuately oscillate about the pivot pin 21 in a plane transverse to the axis of the rear shaft.

Intermediate the ends of the connecting rod is means for adjusting its length. This may be overlapping intermediate ends of the connecting rod, each with a plurality of aligned holes, removably secured together by bolts extending through the aligned holes in the overlap, or, as shown in FIG. 3, a sleeve 46 with interior opposite hand threads receiving correspondingly threaded intermediate ends of the connecting rod. The means 46 permits adjustment of the length of the connecting rod, thus changing the overall length of the rigid link means in order to vary the angular orientation of the support means relative to the frame, to accommodate various adjustments of the radial distance of the crankpin 35 from the axis of the rear shaft 10 and/or to accommodate different vertical extensions of the support post 23 above the vehicle frame.

The vehicle is supplied with means whereby the vehicle supporting wheels 8, 9 and 13 may be rotated in order to move the vehicle linearly and simultaneously to impart to the support means 18 arcuate oscillatory motion about the pivot 21. As best shown in FIG. 3A, this means preferably consists of a pair of pedal cranks 47 and 48 fixed to each end of the front shaft 14 and extending radially therefrom. The pedal cranks are angularly spaced from each other about the axis of the front shaft approximately 180 degrees. Preferably, the pedal cranks are formed integrally with the front shaft as shown, but if desired, they may be removably attached to the front shaft in fixed angular relationship thereto by any conventional means such as a key or cross bolt. On the end portion of each pedal crank remote from the shaft one of the pedal crankpins 49, 50 is attached. The pedal crankpins extend outwardly of the pedal cranks and of the plane of rotation of the front wheel 13 and are adapted to be engaged by the feet of a child seated on the support means at 17. Each pedal crankpin includes a rotatably mounted pedal of conventional type. Thus, a child seated on the vehicle at 17 may apply force by means of his feet to the pedal crankpins in order to apply torque to the front wheel 13 and rotate same. This causes the desired rotation of the rear wheels of the vehicle. Other means may be employed to achieve the function of the pedal cranks and pedal crankpins. For example, a crank and pedal operated chain and sprocket drive may be effected to either the front or the rear wheels, or a crank and pedal connecting rod arrangement may be provided to either the rear wheels or the front wheels. If desired, the vehicle may even be propelled by means of a small motor connected to any of the wheels in conventional fashion.

FIGS. 6, 7 and 8 show another embodiment of the invention. This embodiment is in many respects the same as the heretofore described embodiment shown in FIG. 1 but differs therefrom as hereinafter stated. In this embodiment, the pivot fork 53 and its pivot plate are oriented transversely of the vehicle frame and parallel to the rear shaft 52. The pivot pin 51 is oriented with its axis transverse to the axis of the rear shaft 52. Thus, the support means 55, comprising the pivot fork and the replica attached thereto, is free to move about the pivot pin 51 only in a plane transverse to the vehicle frame and parallel to the axis of the rear shaft. The replica is here illustrated as a duck, but as heretofore explained, it may be of any desired figure. The replica is adapted at 55A to seat a child rider astride the replica with one leg on each side thereof and has a clearance slot 56 similar to the slot 27 shown in FIG. 2 except that the slot is oriented transversely of the vehicle frame in a plane parallel to the plane of movement of the replica about the pivot pin 51. Connecting means extends between and is connected to the support means and the rear shaft. The connecting means is identical to that heretofore described for the embodiment shown in FIG. 1, except that it is comprised of two rigid link means 58 and 59, each with an eccentric connection 60, 61 to the rear shaft. The eccentric connections 60, 61 are each a double crank. The two double cranks are identical to each other and to the double crank 30 heretofore described. They are angularly spaced from each other approximately 180 degrees about the axis of rotation of the rear shaft and are spaced from each other longitudinally of the rear shaft and equally transversely of the axis of the pivot pin 51 on different sides thereof. The rigid link means 58, 59 are each rigidly attached to the pivot fork at 54, 57, one on each side of the pivot pin and spaced equally therefrom transversely of its axis. Thus, when the rear wheels are rotated, the rear shaft 52 rotates, and the connecting means transmits to the pivot fork and thus to the support means an arcuate oscillatory motion about the pivot pin 51 which lies in a plane transverse to the vehicle frame and to the plane of rotation of the rear wheels and parallel to the axis of rotation of the rear shaft. This transverse oscillatory motion will give a different sensation to a rider of the vehicle than the motion of the support means in the embodiment shown in FIG. 1. In all other respects, this embodiment is the same as the heretofore described embodiment shown in FIG. 1, and such description thereof is equally applicable to this embodiment.

FIGS. 9 through 13 show another embodiment of the invention. This embodiment is in some respects similar to each of the heretofore described embodiments, but differs from both thereof as hereinafter stated. Referring now to FIG. 9, the vehicle shown has a vehicle frame 62 which is the same as the vehicle frame 1 heretofore described for the embodiment shown in FIG. 1, except that the single support member 63 is connected to the steering boss 111 by an upwardly extending portion 64, the remainder of the support member 63 being substantially horizontal. Also, the rear fork 65 extends less downwardly and more horizontally than the rear fork 5 of the embodiment shown in FIG. 1. Moreover, the frame 62 does not have a support means boss 6 as shown in FIG. 1, but instead the pivot plate 70, which is similar to the pivot plate 20 shown in FIG. 2, is rigidly attached substantially vertically to the support member 63, such as by welding, at a position intermediate the ends of the vehicle frame 62. If desired, the pivot plate may be adjustably attached to the vehicle frame by means of a support post and support means boss in the same manner as heretofore explained for the embodiment shown in FIG. 1.

Support means 66, similar to the support means heretofore described for the embodiment shown in FIG. 1, is here exemplified by a replica of a projectile-like figure adapted to support a child rider of the vehicle at 67. It includes a pivot fork 68 which sandwiches and is pivotally attached to a pivot plate 70 by means of a pivot pin 69. The pivot fork 68, pivot pin 69 and pivot plate 70 are identical to the similar elements 19 through 22 heretofore described for the embodiment shown in FIG. 1. The pivot fork 68 is attached to the portion 67 of the support means 66 any manner desired, which may be, as shown in FIGS. 9, 10 and 11, a rigid attachment, as by welding, of the pivot fork to a T section which has flanges 71 and 72 extending outwardly and transversely of the pivot fork and longitudinally of the axis of the pivot pin and also has a central web 73 which extends vertically upwardly and normally of the axis of the pivot pin and is fastened to the portion 67 by means of a flange 73A embedded in the replica or riveted thereto. A pair of members 74, 75 are rigidly attached to the outer extremities of the flanges 71 and 72 and are equally spaced from the pivot plate 70. The members 74, 75 each extend along the underside of the full length of the flanges 71 and 72 and upwardly along the back of the seat portion 67 to provide reinforcement for the back of the seat and then at 76 extend to the rear of the vehicle along the underside of the top rear portion of the replica to provide reinforcement therefor against the contingency of a second child climbing on the rear top portion of the replica while engaging in playful antics with a child seated on the portion 67. The reinforcing extension 76 of each of the members 74 and 75 may be extended as far back along the replica as is thought necessary and is suitably attached to the replica by embedment therein or rivets. The replica is suitably cut away so that it can arcuately move about the pivot pin 69 without interference from the remainder of the vehicle and so that a child seated at 67 can reach the pedal crankpins, as 115, with his feet.

As best shown in FIGS. 9, 10 and 11, two connecting means 77, 78 extend between the support means and the rear shaft 79 and are connected to both thereof. The two connecting means are identical, except as stated to the contrary. Each connecting means 77, 78 is comprised of rigid link means and an eccentric connection of the link means to the rear shaft 79 eccentrically of the axis of rotation thereof. Each eccentric connection 82, 83 is identical in construction to the heretofore described eccentric connection 30 of the embodiment shown in FIG. 1. The two eccentric connections 82, 83 are angularly aligned about the axis of rotation of the rear shaft and are spaced from each other longitudinally of the axis of the rear shaft and equally transversely of the pivot plate 70 on opposite sides thereof. The connecting means 77 and 78 each include rigid link means 80, 81. Each rigid link means 80, 81 is comprised of a connecting rod 84, 85, actuating levers 86, 87, connecting links 88, 89, and actuating arms 90, 91, respectively. The construction of the connecting rod is the same as that of the connecting rod 40 heretofore described for the embodiment shown in FIG. 1. Each connecting rod is pivotally connected at its end remote from the rear axle to an aligned actuating lever, as at 92 (FIG. 9). As shown in FIG. 11, each pivotal connection 92 may be in the form of a clevis 93 on the end of the actuating lever in which the eye of the connecting rod is disposed to be pivotally connected thereto by means of a clevis pin 94 which extends through the clevis and the eye of the connecting rod. The other end of each actuating lever is pivotally attached to an aligned connecting link, as at 95 (FIG. 9). The end of the actuating lever may be in the form of a clevis 96 in which the connecting link is disposed. The two pivotal connections 95 may be formed with a separate pivot pin at each pivot, but preferably, a continuous bar extending transversely of the vehicle frame is used to effect the two pivot connections, in order to inhibit any tendency of the two pivots to move other than synchronously. A U-shaped bracket 97 is attached at its back to the rear fork 65 with its legs extending upwardly. Each leg of the bracket 97 is suitably aligned with one of the actuating levers for pivotal attachment of the two by means of pivot pins 98 and 99. The relative extensions of the actuating lever on each side of its pivotal connection to the bracket 97 determines the amount of magnification of the movement applied by the connecting rod to the pivot connection 92, the preferred ratio being two to one, so that, in FIG. 9, the length of the actuating lever from its pivotal connection 99 to its pivotal connection 95 is twice its length from the pivotal connection 99 to the pivotal connection 92. Each connecting link extends upwardly and is pivotally connected, as at 100 (FIG. 9), to the correspondingly aligned actuating arm. The two pivotal connections between the actuating arms and the connecting links are made in the same manner as heretofore described for the pivotal connections between the connecting links and the actuating levers. Each actuating lever has a portion extending downwardly from its pivotal conection to the connecting link which extends to and is fixed to an end of the shaft 102. The shaft 102 extends transversely of the vehicle frame and substantailly parallel to the axis of the pivot pin 68 through and exteriorly of the support members 74, 75 and is slidably and rotatively journaled therein, so that rotation of the actuating arm rotates the shaft and it may slide in its bearings longitudinally of its axis. The actuating arms are fixed to the shaft 102 in conventional manner, such as a set screw registering in a hole in the shaft or suitable keys between the actuating arm and the shaft. The actuating arms 90, 91 are identical in their extent between the shaft 102 and their pivotal connections to the connecting links. They differ in that the actuating arm 91 has an upwardly extending actuator handle 103 attached to it in the vicinity of its connection to the shaft 102. It is preferred that the actuator handle 103 be formed integrally with the remainder of the actuating arm, as is shown in FIG. 9.

By arcuately moving the actuator handle about the axis of the shaft 102, the support means 66 is moved about the pivot pin 69, thereby changing the limiting angular orientation of the support means relative to the vehicle frame within which it is free to oscillate about the pivot 69 responsively to rotation of the rear shaft 79. The actuator handle 103 is adapted so that it can be operated by an occupant of the vehicle seated on the portion 67 of the replica. As shown in FIGS. 12 and 13, the actuator handle is releasably secured against movement by the registering of a stop pin 104 in one of the spaced holes 105, 106 and 107 formed in a bracket 108 which is rigidly attached to the support member 74. The stop pin 104 is secured to the actuator handle so that it will not be lost. Registry of the stop pin 104 in a particular hole in the bracket 108 is maintained by means of a compression spring 109 interposed between the support member 74 and the actuating arm 91 which urges the actuator handle outwardly against the bracket. The stop pin 104 may be removed from a particular hole and moved to register in a different hole by a slight pull on the actuator handle laterally away from the bracket 108 which, due to the slidability of the shaft 102, resiliency of the actuating arm 91 and the working play in the pivotal connection 100, displaces the actuator handle inwardly toward the center of the vehicle sufficiently to disengage the stop pin from the hole in the bracket 108. This adjustment of the angular orientation of the support means relative to the frame is advantageous because it would undoubtedly be appealing to childish imagination in that a child, by adjusting the angle, could imagine that he was descending when the forward part of the support means was tipped downwardly or ascending when the forward part of the support means was tipped upwardly. Alternatively, other means may be used to achieve the function of the stop pin 104 and the bracket 108, such as a conventional ratchet engaging teeth in the actuator handle.

If desired, a suitable support link may be extended between and pivotally connected to each portion 76 of the members 74, 75 and the aligned actuating arms 90, 91 to provide additional support for the top rear portion of the replica.

The remainder of the embodiment shown in FIGS. 9 through 13, particularly the handlebar 110, steering boss 111, steering fork 112, vehicle supporting wheels 113, 116 and 117, pedal cranks 114, pedal crankpins 115, front shaft, and rear shaft 79 are all the same as the heretofore described corresponding items in the embodiment shown in FIG. 1.

It is apparent that a rider seated at 67 may steer the vehicle by means of the handlebar 110 and rotate the front wheel 113 by means of contact of his feet with the pedal crankpins associated with the front wheel 113. The rotation of the front wheel 113 would cause the vehicle to move linearly, thus rotating the rear wheels 116 and 117 which, through the connecting means 77 and 78, will arcuately oscillate the support means about the pivot pin 69 in a plane transverse to the axis of rotation of the rear axle 79 and parallel to the plane of rotation of the rear wheels.

The inventive concept would include a vehicle having a plurality of supporting wheels greater than three, such as a four-wheeled vehicle. Moreover, various changes could be made in the connecting means which causes the support means to move or oscillate relative to the vehicle frame responsively to rotation of the wheels of the vehicle, as, for example, the rotation of the rear shaft 79 could be geared or chain and sprocket connected to a rotatable countershaft which would have the eccentrics fixed to it.

The invention is not to be understood to be restricted to the details set forth above since these may be modified within the scope of the appended claims without departing from the spirit and scope of the invention.

I claim:

1. In a vehicle for a child, a vehicle frame having a plurality of vehicle supporting wheels journaled thereon, a shaft extending transversely of the frame and journaled therein, said shaft being fixed at each end to one of said vehicle supporting wheels so that rotation of the wheels rotates the shaft, support means for supporting a rider of the vehicle, said support means including a three-dimensional replica of a figure, pivot means for pivotally mounting the support means on the frame for movement of the replica about a pivot axis only in a plane parallel to the shaft, means for rotating the wheels adapted to be actuated by the rider, two spaced double cranks fixed to and extending radially from the shaft intermediate the wheels fixed to the shaft, said double cranks being angularly spaced about the axis of the shaft approximately 180° from each other and spaced equally transversely of the pivot axis of the pivot means, one on each side of the pivot axis of the pivot means, each double crank having a pair of angularly aligned cranks spaced from each other and a crankpin radially spaced from and substantially parallel to the shaft extending between and connecting together the pair of cranks, first rigid link means extending between and connected to the support means and to the crankpin of one of the double cranks, second rigid link means extending between and connected to the support means and to the crankpin of the other double crank, whereby rotation of the wheels rotates each crankpin about the axis of the shaft and imparts arcuate oscillatory movement to the support means about the pivot axis of the pivot means, means within the extents of the first and second link means for varying the extents of said link means between the support means and the respective crankpin to vary and preselect the amplitude of the arcuate oscillatory movement of the support means imparted thereto by rotation of the wheels, a second shaft fixed intermediate its ends to another third one of said vehicle supporting wheels and journaled in the frame with its axis lying in a plane substantially parallel to the plane of the axis of the shaft at a location which spaces the third wheel substantially equally from each wheel fixed to the shaft and also transversely of the axis of the shaft, said means for rotating the wheels comprising a pedal crank fixed to each end of the second shaft and extending radially therefrom, said pedal cranks being angularly spaced about the axis of the second shaft approximately 180° from each other and each said pedal crank having an outwardly extending pedal crankpin fixed to its end portion adapted to be engaged by a foot of a rider of the vehicle, and means for adjustably changing the spacing between the replica and the pedal crankpins to accommodate different leg lengths of a rider, whereby force may be applied to the pedal crankpins by the feet of a rider to rotate the third wheel and thereby rotate all of the wheels of the vehicle to move the vehicle linearly and simultaneously cause the replica to arcuately oscillate about its pivot axis relative to the frame in a plane transverse to the frame of the vehicle and parallel to the axis of the shaft.

2. In a vehicle for a child, a vehicle frame having a plurality of vehicle supporting wheels journaled thereon, a shaft extending transversely of the frame and journaled therein, said shaft being fixed at each end to one of said vehicle supporting wheels so that rotation of the wheels rotates the shaft, support means for supporting a rider of the vehicle, said support means including a three-dimensional replica of a figure, pivot means for pivotally mounting the support means on the frame for movement of the replica about a pivot axis only in a plane parallel to the shaft, means for rotating the wheels adapted to be actuated by the rider, two spaced double cranks fixed to and extending radially from the shaft intermediate the wheels fixed to the shaft, said double cranks being angularly spaced about the axis of the shaft approximately 180° from each other and spaced equally transversely of the pivot axis of the pivot means, one on each side of the pivot axis of the pivot means, each double crank having a pair of angularly aligned cranks spaced from each other and a crankpin radially spaced from and substantially parallel to the shaft extending between and connecting together the pair of cranks, first rigid link means extending between and connected to the support means and to the crankpin of one of the double cranks, second rigid link means extending between and connected to the support means and to the crankpin of the other double crank, whereby rotation of the wheels rotates each crankpin about the axis of the shaft and imparts arcuate oscillatory movement to the support means about the pivot axis of the pivot means, a second shaft fixed intermediate its ends to another third one of said vehicle supporting wheels and journaled in the frame with its axis lying in a plane substantially parallel to the plane of the axis of the shaft at a location which spaces the third wheel substantially equally from each wheel fixed to the shaft and also transversely of the axis of the shaft, said means for rotating the wheels comprising a pedal crank fixed to each end of the second shaft and extending radially therefrom, said pedal cranks being angularly spaced about the axis of the second shaft approximately 180° from each other and each said pedal crank having an outwardly extending pedal crankpin fixed to its end portion adapted to be engaged by a foot of a rider of the vehicle, whereby force may be applied to the pedal crankpins by the feet of a rider to rotate the third wheel and thereby rotate all of the wheels of the vehicle to move the vehicle linearly and simultaneously cause the replica to arcuately oscillate about its pivot axis relative to the frame in a plane transverse to the frame of the vehicle and parallel to the axis of the shaft.

3. In a vehicle for a child, a vehicle frame having a plurality of vehicle supporting wheels journalled therein, support means defining a portion for receiving and supporting a rider of the vehicle, mounting means for mounting the support means on the frame for pivotal movement of the support means about a pivot axis, means for rotating the wheels, a shaft extending transversely of the frame and journalled therein, said shaft adapted to be connected to a pair of vehicle supporting wheels to be rotatably driven thereby, said pivot axis being disposed at right angles to the shaft, two double crank means fixed to and extending radially of the shaft intermediate the wheels, said double crank means being angularly spaced about the axis of the shaft approximately 180° from each other on each side of the pivot means, each said double crank means including a pair of angularly aligned cranks spaced from each other and a crankpin radially spaced from and substantially parallel to the shaft extending between and connecting together the pair of cranks, rigid link means extending between and connected to the support means and to each crankpin whereby rotation of the wheels rotates the crankpins about the axis of the shaft and imparts arcuate oscillatory movement to the support means about its pivot axis, the rigid link means comprising a first rigid link means connected to one of the crankpins and a second rigid link means connected to the other crankpin, both rigid link means being connected to the support means, one on each side of the pivot axis, whereby rotation of the wheels rotates each crankpin about the axis of the shaft and imparts arcuate oscillatory movement to the support means in a plane transverse to the frame of the vehicle and parallel to the axis of the shaft, and means for varying the extent of the first and second rigid link means between the support means and each crankpin to vary the amplitude of oscillation of the support means.

4. In a vehicle for a child, a vehicle frame having a plurality of vehicle supporting wheels journalled thereon, a shaft extending transversely of the frame and journalled therein, said shaft being fixed at each end to one of said vehicle supporting wheels so that rotation of the wheels rotates the shaft, support means for supporting a rider of the vehicle, said support means including a three-dimensional replica of a figure, pivot means for pivotally mounting the support means on the frame for movement of the replica about a pivot axis only in a plane parallel to the shaft, means for rotating the wheels adapted to be actuated by the rider, two spaced double crank means fixed to and extending radially from the shaft intermediate the wheels fixed to the shaft, said double cranks being angularly spaced about the axis of the shaft approximately 180° from each other and spaced equally transversely of the pivot axis of the pivot means, one on each side of the pivot axis of the pivot means, each double crank means having a pair of angularly aligned cranks spaced from each other and a crankpin radially spaced from and substantially parallel to the shaft extending between and connecting together the pair of cranks, first rigid link means extending between and connected to the support means and to the crank pin of one of the double crank means, and second rigid link means extending between and connected to the support means and to the crank pin of the other double crank means, whereby actuation of the means for rotating the wheel by a rider of the vehicle rotates the wheels and rotates each crankpin about the axis of the shaft and imparts arcuate oscillatory movement to the support means about the pivot axis of the pivot means.

5. In a vehicle for a child, a vehicle frame having a plurality of vehicle supporting wheels journalled thereon, a shaft extending transversely of the frame and journalled therein, said shaft being fixed at each end to one of said vehicle supporting wheels so that rotation of the wheels rotates the shaft, support means for supporting a rider of the vehicle, said support means including a three-dimensional replica of a figure, pivot means for pivotally mounting the support means on the frame for movement of the replica about a pivot axis only in plane parallel to the shaft, means for rotating the wheels adapted to be actuated by the rider, at least one double crank means fixed to and extending radially from the shaft intermediate the wheels fixed to the shaft, said double crank being spaced transversely of the pivot axis of the pivot means on one side of the pivot axis of the pivot means, said double crank means having a pair of angularly aligned cranks spaced from each other and a crankpin radially spaced from and substantially parallel to the shaft extending between and connecting together the pair of cranks, rigid link means extending between and connected to the supoprt means and to the crankpin of said double crank means, whereby actuation of the means for rotating the wheels by a rider of the vehicle rotates the wheels and rotates said crankpin about the axis of the shaft and imparts arcuate oscillatory movement to the support means about the pivot axis of the pivot means.

References Cited in the file of this patent
UNITED STATES PATENTS

| | | |
|---|---|---|
| 361,581 | Ellis | Apr. 19, 1887 |
| 827,481 | Tresouthick | July 31, 1906 |
| 838,700 | Engleman | Dec. 18, 1906 |
| 973,303 | Replogle | Oct. 18, 1910 |
| 1,088,185 | Swender | Feb. 24, 1914 |
| 1,232,416 | Whitt | July 3, 1917 |
| 1,506,726 | Alexander | Aug. 26, 1924 |
| 1,519,493 | Harker | Dec. 16, 1924 |
| 2,626,161 | Thacker | Jan. 20, 1953 |
| 2,796,265 | Fields et al. | June 18, 1957 |